Oct. 6, 1925.

L. P. HALLADAY

FENDER GUARD

Filed Oct. 8, 1924

1,555,920

Inventor:
Lewis P. Halladay
By Parker + Carter
Attys.

Patented Oct. 6, 1925.

1,555,920

UNITED STATES PATENT OFFICE.

LEWIS P. HALLADAY, OF DECATUR, ILLINOIS, ASSIGNOR TO L. P. HALLADAY COMPANY, OF DECATUR, ILLINOIS, A CORPORATION OF DELAWARE.

FENDER GUARD.

Application filed October 8, 1924. Serial No. 742,309.

*To all whom it may concern:*

Be it known that I, LEWIS P. HALLADAY, a citizen of United States, residing at Decatur, in the county of Macon and State of Illinois, have invented a certain new and useful Improvement in Fender Guards, of which the following is a specification.

My invention relates to an improvement in rear fender guards for automobiles, and has for purpose to provide a fender guard which shall be simple, strong, easy to manufacture and assemble and which shall be for firm attachment to the automobile frame. Other objects will appear from time to time in the course of the specification and claims.

I illustrate my invention more or less diagrammatically in the accompanying drawings, wherein—

Like parts are illustrated by like symbols throughout the specification and drawings.

A diagrammatically illustrates the rear of an automobile, and $A^1$, $A^1$ are the rear ends of the longitudinal side frame members to which the fender guards are normally attached, the frame ends being downwardly bent or turned.

Figure 1:
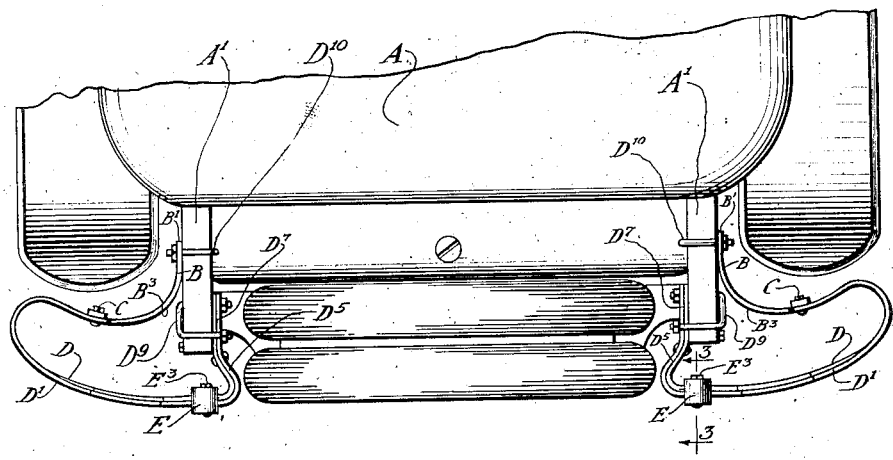
Figure 1 is a plan view of the rear of the automobile with my fender guards in position.
Figure 3:
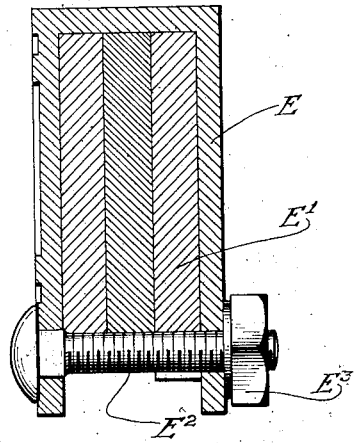
Figure 3 is a section on an enlarged scale taken along line 3—3 of Figure 1.
Figure 2:
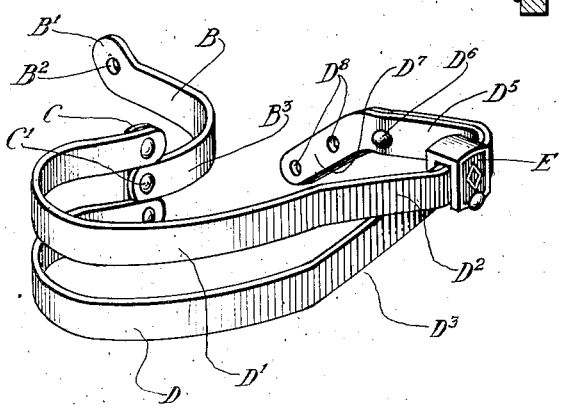
Figure 2 is a perspective of a fender guard.

B is a fender supporting element provided with an upwardly turned forward terminal element $B^1$ perforated as at $B^2$. The opposite end is outwardly curved or bent as at $B^3$. Secured to the outwardly curved end $B^3$ is the relatively vertically positioned securing member or brace C, the middle of which is secured as at $C^1$ to the outwardly bent portion $B^3$ of the member B. Above and below its point of attachment with the member B it has secured to it the upper and lower fender bars D, $D^1$ which at their point of attachment to the vertical member C are vertically spaced but lie in substantially the same vertical plane. They project first outwardly and then are curved rearwardly and inwardly, as shown in Figure 2. The member $D^1$ is positioned above the member D at a point almost in alignment with the frame members $A^1$.

D, $D^1$ incline toward each other as at $D^2$, $D^3$ and finally overlap and continue side by side, being clamped together, for example, by the clamp E, which is provided with a spacing block $E^1$ and the bolt and nut $E^2$, $E^3$. The two members D, $D^1$ continue side by side beyond the clamp E, being bent sharply to the rear as at $D^5$, and being bolted together as at $D^6$. In the form herein shown the inner ends are downwardly and rearwardly bent as at $D^7$, being perforated as at $D^8$, $D^8$ to receive the U-bolt $D^9$ which surrounds the frame member. $D^{10}$ is any suitable hook bolt adapted to pass through the aperture $B^2$ and secure the element B to the frame member $A^1$.

While I have shown a thoroughly practical and operative device, it will be realized that many changes might be made in the size, shape, number, disposition and relation of parts without departing from the spirit of my invention, and I therefore wish my description and drawings to be taken as in a broad sense illustrative, rather than as limiting me to the specific form or forms described and shown.

The use and operation of my invention are as follows:

I have invented a simple, practical and very robust type of fender guard in which two fender elements are employed, which are superposed throughout substantially their entire length to form a relatively broad contacting surface. At one end the two elements are spaced apart by the supporting member or curved brace B, but at the other they are drawn down together to reinforce each other and to connect with the frame at one point. The bracing or reinforcing action of the two bumper elements provides a peculiarly strong and efficient fender guard, and one which is particularly simple and easily attachable to the automobile frame.

I claim:

1. A fender guard comprising a plurality of bars vertically spaced apart at one end, and overlapping at the other, the vertically spaced ends being rearwardly and inwardly curved to lie behind the relatively broad contacting surface formed by the forward portion of said vertically spaced bars, the overlapping portions of said bars being rearwardly turned.

2. A fender guard comprising a plurality of bars vertically spaced apart at one end, and overlapping at the other, the vertically spaced ends being rearwardly and inwardly curved to lie behind the relatively broad contacting surface formed by the forward portion of said vertically spaced bars, the opposite ends of said bars being positioned side by side and being downwardly and rearwardly inclined.

3. A fender guard comprising a plurality of bars vertically spaced apart at one end, and overlapping at the other, the vertically spaced ends being rearwardly and inwardly curved to lie behind the relatively broad contacting surface formed by the forward portion of said vertically spaced bars, the opposite ends of said bars being positioned side by side and being downwardly and rearwardly inclined, being rigidly and permanently secured together.

4. A fender guard comprising a plurality of bars vertically spaced apart at one end, and overlapping at the other, the vertically spaced ends being rearwardly and inwardly curved to lie behind the relatively broad contacting surface formed by the forward portion of said vertically spaced bars, the opposite ends of said bars being positioned side by side and being downwardly and rearwardly inclined and being secured to the automobile frame by the same securing means.

5. A fender guard comprising a plurality of bars vertically spaced apart at one end, and overlapping at the other, the vertically spaced ends being rearwardly and inwardly curved to lie behind the relatively broad contacting surface formed by the forward portion of said vertically spaced bars, a vertical connector element connecting the upper and lower bar, and a single curved brace secured to said vertical connector element intermediate its connection with the upper and lower bars.

Signed at Decatur county of Macon and State of Illinois, this 17th day of September, 1924.

LEWIS P. HALLADAY.